2,856,276

COMPOSITION AND PROCESS FOR EXTENDING FLOWER LIFE

Leonard Harlan Weinstein, Yonkers, N. Y., assignor to Boyce Thompson Institute for Plant Research, Inc., a corporation of New York No Drawing. Application December 29, 1955
Serial No. 556,079

11 Claims. (Cl. 71—2.4)

This invention relates to the preservation of cut flowers, and particularly to extend their vase life or freshness. The invention provides a treatment process for extending or preserving the freshness and color of cut pink and red roses, and a composition of chemicals for this purpose.

Heretofore, many substances including salts of maleic acid hydrazide have been added to the water in which cut flowers are kept to extend their vase life. While water solutions of salts of maleic acid hydrazide are effective for extending the freshness of cut flowers they are not suitable for use in the treatment of pink and red roses because the roses turn blue.

This invention is based on my discovery that a water solution of a salt of maleic acid hydrazide, a salt of aluminum, cobalt or manganese and a strong acid, such as sulfuric acid or hydrochloric acid, and a chelating agent will maintain the freshness of the roses, i. e. extend their vase life as when using a salt of maleic acid hydrazide, but without turning the roses blue. It appears that the chelating agent reacts with the salt of the strong acid forming sulfuric acid or hydrochloric acid as the case may be and lowering the pH to the effective range of about 3.5 to 4.5. Suitable preferred chelating agents which have been found to be effective are those which prevent precipitation of the metals and give the required pH, such as the polycarboxylic acids, and the aminopolycarboxylic acids, and their alkali metal salts. Specific preferred compounds are citric acid, ethylene diamine tetraacetic acid and its alkali metal salts, N-hydroxyethylethylenediaminetriacetic acid and diethylenetriamine pentaacetic acid and its alkali metal salts.

According to one embodiment of the process of my invention, the freshly cut roses are given a pre-treatment in a water solution of the composition of my invention before they are shipped to the consumer. The flowers imbibe the solution and when later placed in a vase of fresh water the vase life of the flowers is extended and the color is maintained.

The composition of my invention may be prepared for use by the consumer as a solid, or as a solution, comprising the required proportions of the chemicals, and units of the composition may be added to measured quantities of water to form a solution of the proper concentration for immersing the stems of the flowers in carrying out a process of the invention.

The following are examples of preferred compositions of my invention.

(1)

0.618 gram of $Al_2SO_4 \cdot 18H_2O$
1.7 grams of disodium ethylenediaminetetraacetate dihydrate
0.9 gram of maleic acid hydrazide
0.7 gram of diethanolamine This composition added to 1000 mls. of water gives:

100 parts of aluminum
1500 parts of ethylenediaminetetraacetic acid
1500 parts of maleic acid hydrazide
1,000,000 parts of water (2)

0.618 gram of $Al_2SO_4 \cdot 18H_2O$
1.0 gram of citric acid
0.9 gram of maleic acid hydrazide
0.7 gram of diethanolamine This composition added to 1000 mls. of water gives:

100 parts of aluminum
800 parts of citric acid
1500 parts of maleic acid hydrazide
1,000,000 parts of water Similar compositions may be made by using 0.477 gram of $CoSO_4 \cdot 7H_2O$ or 0.38 gram of $MnSO_4 \cdot H_2O$ as a substitute for the $Al_2SO_4 \cdot 18H_2O$.

These compositions are colorless, odorless, and are stable. Since the maleic acid hydrazide is insoluble in water, the diethanolamine is added to the composition to form the water-soluble amine salt.

Final concentrations of the salt of maleic acid hydrazide of between 500 and 2000 parts per million have been found to be effective depending upon the ambient room temperature and percent of relative humidity at the time of treatment.

In preparing aqueous solutions of the compositions, the salt, for example, $Al_2SO_4 \cdot 18H_2O$ and the chelating agent, for example, citric acid, are dissolved in water. Maleic acid hydrazide is insoluble in water and it is necessary to form its water-soluble salt, preferably the amine salt. It is accordingly preferred to form this salt in solution and to add 150 mls. of a water solution containing 5.0 grams of maleic acid hydrazide and 4.6 grams of diethanolamine. Then water is added to the solution containing the metal salt, chelating agent and amine salt of maleic acid hydrazide to make the volume up to one liter. The chelating agent reacts with the metal salt and forms an acid, lowering the pH of the solution. It is accordingly necessary to use such proportions of metal salt and chelating agent that the desired pH is attained, preferably from 3.5 to 4.5. The chelating agent prevents the metal from precipitating and it does not interfere with the preserving action of the salt of maleic acid hydrazide.

While the chemical compositions may be used in the home or other place where the flowers are displayed by adding them to the vase water, they are especially useful by the rose grower who cuts buds for temporary storage and shipment to wholesale stores or stores that sell directly to the consumer. Roses of the type that are most effectively treated according to the invention are known as Better Times and Briarcliff.

In the pre-treatment of such roses by the grower, the rose buds are cut and immediately the stems are immersed in an aqueous solution of my composition. The solution acts on the principle of growth inhibition and the imbibed solution acts on the development and vase life of the flower. The rose buds open slower, and attain a final form and shape superior to the untreated roses kept in water alone or in other chemical preservatives. Freshly cut roses may be placed in warm solutions of this chemical (110° to 125° F.) for 1 to 4 hours, then stored in the chemical solution in a refrigerator at about 40° F. for 24 to 48 hours. At the end of this time they are removed from the chemical and placed in water or stored dry in the refrigerator until shipped. They may then be placed in water or, if desired, in sugar-type preservatives at room temperature. The grower or the consumer may also immerse rose stems in this solution at room temperature for 12 to 24 hours, depending on the temperature and relative humidity, then transfer them to water.

The following example illustrates the preservation of Better Times roses which were cut in the commercial bud stage. The roses were immersed for 24 hours in water solutions of the compositions at 70° F. and 55% relative humidity and then transferred to water. The stems of the control roses were immersed only in water. Three vases each containing three roses were used for the treatment and the following Table gives the results five days after the initiation of the treatment, nine with water, nine with EDTA composition, and nine with citric acid composition.

chelating agent is of the group consisting of diethylenetriamine pentaacetic acid and its alkali metal salts.

7. In the treatment of pink and red roses to extend their vase life and prevent them from turning blue, the improvement which comprises immersing the stems of the cut roses in a water solution comprising a water-soluble salt of maleic acid hydrazide, a salt of an acid of the group consisting of sulfuric acid and hydrochloric acid and a metal of the group consisting of aluminum, cobalt and manganese, and a polycarboxylic acid chelating agent, said solution having a pH of about 3.5 to 4.5 resulting from the reaction of the metal salt of the strong acid and the chelating agent.

8. The process of claim 7 in which the chelating agent is of the group consisting of citric acid and its alkali metal salts.

9. The process of claim 7 in which the chelating agent is of the group consisting of ethylenediaminetetraacetic acid and its alkali metal salts.

| Treatment | #1 | | #2 | | #3 | | #4 | | #5 | |
|---|---|---|---|---|---|---|---|---|---|---|
| | Stage | Color | Stage | Color | Stage | Color | Stage | Color | Stage | Color |
| Water | 3 | + | 3 | + | 4 | | 4 | | 4 | |
| MH 1500 / Al 100 / EDTA 1500 | 2 | ++++ | 2 | ++++ | 3 | +++ | 3 | ++++ | 3 | ++++ |
| MH 1500 / Al 100 / Citric 800 | 2 | ++++ | 2 | ++++ | 2 | ++++ | 2 | ++++ | 2 | ++++ |

| Treatment | #6 | | #7 | | #8 | | #9 | |
|---|---|---|---|---|---|---|---|---|
| | Stage | Color | Stage | Color | Stage | Color | Stage | Color |
| Water | 4 | | 4 | | 4 | | 4 | |
| MH 1500 / Al 100 / EDTA 1500 | 3 | ++++ | 3 | ++++ | 4 | | 4 | |
| MH 1500 / Al 100 / Citric 800 | 3 | ++++ | 3 | ++++ | 3 | ++++ | 4 | |

Final stage of development:
1—Rose half open.
2—Rose three-fourths open, center not showing.
3—Rose fully open, center showing.
4—Petals fallen off.
MH = Maleic acid hydrazide.
Al = $Al_2SO_4 \cdot 18H_2O$.
EDTA = disodium ethylenediaminetetraacetate dihydrate.

Color:
+ Severe blueing of petals.
++ Moderate blueing of petals.
+++ Slight blueing of petals.
++++ No blueing of petals.

I claim:

1. A composition for preserving the freshness of pink and red roses and preventing the roses from turning blue, comprising the salt of a strong acid of the group consisting of sulfuric acid and hydrochloric acid and a metal of the group consisting of aluminum, cobalt, and manganese, a water-soluble salt of maleic acid hydrazide, and a polycarboxylic acid chelating agent, said salt and chelating agent being used in such proportions that the aqueous solutions thereof for preserving the roses have a pH of about 3.5 to 4.5.

2. A composition as defined in claim 1 in which the chelating agent is of the group consisting of an aminopolycarboxylic acid and its alkali metal salts.

3. A composition as defined in claim 1 in which the chelating agent is of the group consisting of citric acid and its alkali metal salts.

4. A composition as defined in claim 1 in which the chelating agent is of the group consisting of ethylenediaminetetraacetic acid and its alkali metal salts.

5. A composition as defined in claim 1 in which the chelating agent is of the group consisting of N-hydroxyethylethylenediaminetriacetic acid and its alkali metal salts.

6. A composition as defined in claim 1 in which the

10. The process of claim 7 in which the chelating agent is of the group consisting of N-hydroxyethylethylenediaminetriacetic acid and its alkali metal salts.

11. The process of claim 7 in which the chelating agent is of the group consisting of diethylenetriamine pentaacetic acid and its alkali metal salts.

References Cited in the file of this patent

UNITED STATES PATENTS

| Re. 23,115 | Lontz | May 24, 1949 |
| 1,978,201 | Heuer | Oct. 23, 1934 |

FOREIGN PATENTS

| 154,162 | Australia | Nov. 16, 1953 |
| 980,107 | France | Dec. 20, 1950 |

OTHER REFERENCES

Zukel: "Use of Maleic Hydrazide as a Plant Growth Regulator," published May 1950 in "Agricultural Chemicals" (magazine), vol. 5, No. 5, pages 5, 35, 36, 84, 85.

Fillmore: "The Control of Plant Development With Maleic Hydrazide," published May 26, 1950, in Arnoldia, vol. 10, No. 6, pages 33 through 38.

(Other references on following page)

OTHER REFERENCES

Chemical Abstracts, vol. 45, published 1951, column 10, 465B; article "Maleic Hydrazide as a Plant-Growth Regulant."

Lougheed: "Present Status of Maleic Hydrazide," published before June 15, 1954, in Proceedings of 7th Meeting, Eastern Section, National Weed Committee, at Kemptville, Ontario, Canada, pages 114, 115, 116.

Von Guttenberg: "Wachstrum und Bewegung," published before June 30, 1954 in Fortschritte der Botanik, vol. 15, pages 377 through 399 in all; only pages 392, 393, 398, 399 are relied on.

Chemical Abstracts, vol. 48, published 1954, column 10,845i, article "Growth and Motion."

Chemical Abstracts, vol. 48 published 1954, column 10,979a, article "Retardation of Maturation———."